United States Patent
Xie et al.

(10) Patent No.: US 11,202,269 B2
(45) Date of Patent: Dec. 14, 2021

(54) DEVIATION-BASED INFORMATION TRANSMISSION METHOD, NETWORK DEVICE, AND TERMINAL DEVICE

(71) Applicant: HUAWEI TECHNOLOGIES CO., LTD., Shenzhen (CN)

(72) Inventors: Xinqian Xie, Beijing (CN); Zhiheng Guo, Beijing (CN); Wei Sun, Shenzhen (CN); Yongqiang Fei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/716,400

(22) Filed: Dec. 16, 2019

(65) Prior Publication Data

US 2020/0120627 A1    Apr. 16, 2020

Related U.S. Application Data

(63) Continuation of application No. PCT/CN2018/091390, filed on Jun. 15, 2018.

(30) Foreign Application Priority Data

Jun. 16, 2017  (CN) .......................... 201710459305.2

(51) Int. Cl.
*H04W 56/00* (2009.01)
*H04W 72/04* (2009.01)
*H04W 72/12* (2009.01)

(52) U.S. Cl.
CPC ..... *H04W 56/001* (2013.01); *H04W 56/0065* (2013.01); *H04W 72/0446* (2013.01); *H04W 72/1268* (2013.01); *H04W 72/1289* (2013.01)

(58) Field of Classification Search
CPC ........... H04W 56/001; H04W 56/0065; H04W 72/0446; H04W 72/1268; H04W 72/1289; H04W 56/002; H04W 72/12
See application file for complete search history.

(56) References Cited

U.S. PATENT DOCUMENTS

2007/0127416 A1*  6/2007  Terasawa ............. H04B 7/2668
                                                370/331
2009/0006032 A1*  1/2009  Wilcox ............. G07C 9/00309
                                                702/176
(Continued)

FOREIGN PATENT DOCUMENTS

CN        104519590 A    4/2015
CN        105376849 A    3/2016
(Continued)

OTHER PUBLICATIONS

Huawei et al.,"Overview of NR UL for LTE-NR coexistence",3GPP TSG RAN WG1 Meeting #89 R1-1706905, Hangzhou, China, May 15-19, 2017,total 13 pages.

(Continued)

*Primary Examiner* — Jael M Ulysse
(74) *Attorney, Agent, or Firm* — Hauptman Ham, LLP

(57) ABSTRACT

Embodiments provide an information sending method, an information receiving method, a network device, and a terminal device, to enable the terminal device to determine a correct uplink transmission time, thereby avoiding an uplink transmission failure. For achieving this, a network device determines a first receiving start time and a first sending start time. The first receiving start time is a receiving time at which the network device starts to receive a signal in a first time period, and the first sending start time is a sending time at which the network device starts to send a signal in a second time period. The network device sends indication information to a terminal device to instruct the terminal device to determine a second sending start time. The second sending start time is determined based on the first receiving start time and the first sending start time.

20 Claims, 6 Drawing Sheets

(56) References Cited

U.S. PATENT DOCUMENTS

| | | | |
|---|---|---|---|
| 2010/0020786 A1* | 1/2010 | Futaki | H04W 56/0005 370/350 |
| 2011/0107170 A1* | 5/2011 | Park | H04L 1/1854 714/749 |
| 2011/0280202 A1* | 11/2011 | Lee | H04L 5/0044 370/329 |
| 2012/0120944 A1* | 5/2012 | Yang | H04L 7/04 370/350 |
| 2014/0269633 A1* | 9/2014 | Behnamfar | H04L 5/0073 370/336 |
| 2015/0043543 A1* | 2/2015 | Uchino | H04L 5/0078 370/336 |
| 2015/0270932 A1* | 9/2015 | Agiwal | H04L 1/1816 370/336 |
| 2016/0205705 A1* | 7/2016 | Chen | H04W 74/0833 370/328 |
| 2016/0302129 A1* | 10/2016 | Lohr | H04W 36/30 |
| 2016/0323852 A1* | 11/2016 | Golitschek Edler von Elbwart | H04L 1/1887 |
| 2016/0345179 A1 | 11/2016 | Chen et al. | |
| 2016/0366704 A1* | 12/2016 | Lee | H04W 72/0413 |
| 2016/0380742 A1* | 12/2016 | Suzuki | H04L 5/14 370/280 |
| 2017/0150367 A1* | 5/2017 | Han | H04L 5/0092 |
| 2017/0353272 A1* | 12/2017 | Takeda | H04L 1/1864 |
| 2018/0014301 A1* | 1/2018 | Chen | H04L 1/1861 |
| 2018/0132235 A1* | 5/2018 | Hosseini | H04W 24/10 |

FOREIGN PATENT DOCUMENTS

| | | |
|---|---|---|
| CN | 106376050 A | 2/2017 |
| CN | 106550415 A | 3/2017 |
| WO | 2016126108 A1 | 8/2016 |
| WO | 2017079530 A1 | 5/2017 |
| WO | 2017091123 A1 | 6/2017 |
| WO | 2017100355 A1 | 6/2017 |

OTHER PUBLICATIONS

R1-1701668 Huawei et al.,"Considerations of NR UL operation" 3GPP TSG RAN WG1 Meeting #88,Athens, Greece Feb. 13-17, 2017,total 5 pages.

Huawei et al: "overview of NR UL for LTE-NR coexistence", 3GPP Draft; R1-1709383, May 17, 2017 (May 17, 2017), XP051285096,total 16 pages.

* cited by examiner

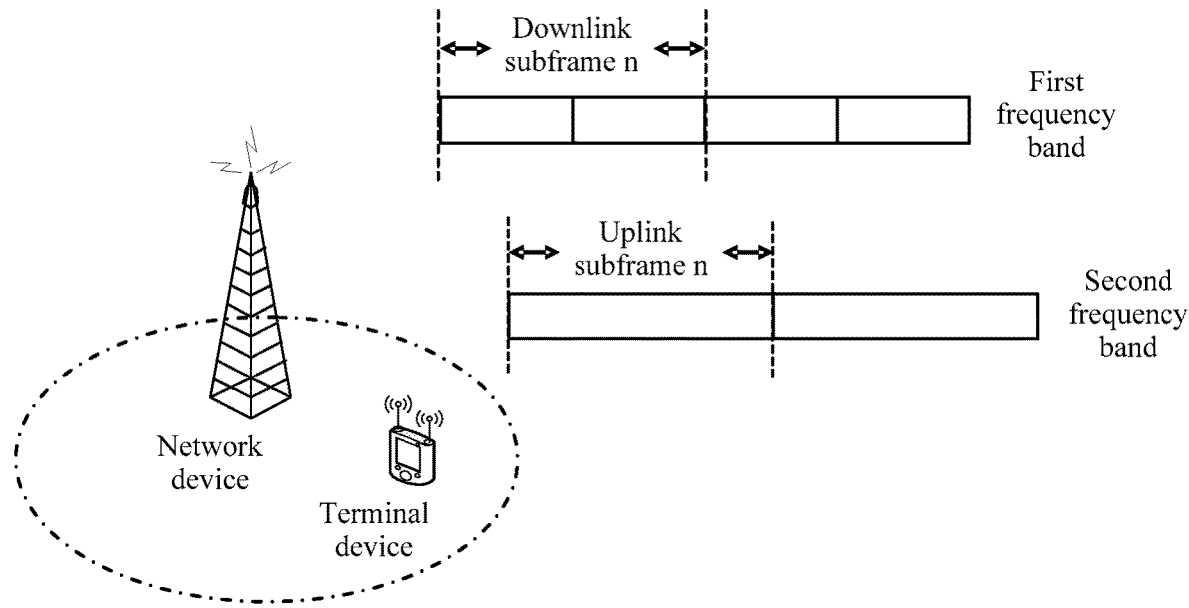

FIG. 1

A network device determines a first receiving start time and a first sending start time, where the first receiving start time is a receiving time at which the network device starts to receive a signal in a first time period, and the first sending start time is a sending time at which the network device starts to send a signal in a second time period — 201

The network device sends indication information to a terminal device, where the indication information is used to instruct the terminal device to determine a second sending start time, and the second sending start time is determined based on the first receiving start time and the first sending start time — 202

FIG. 2

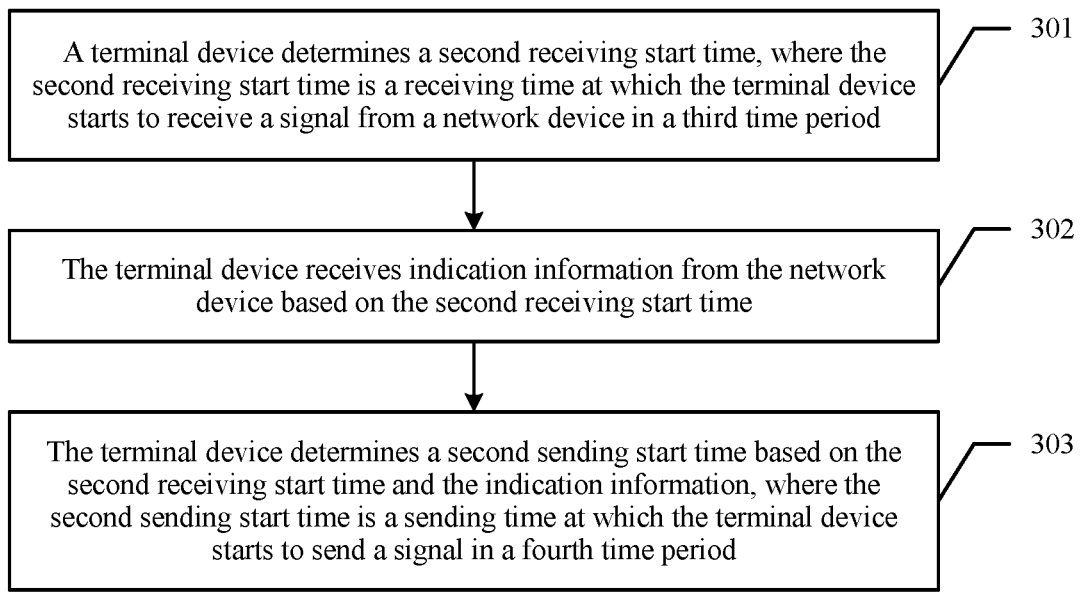
FIG. 3
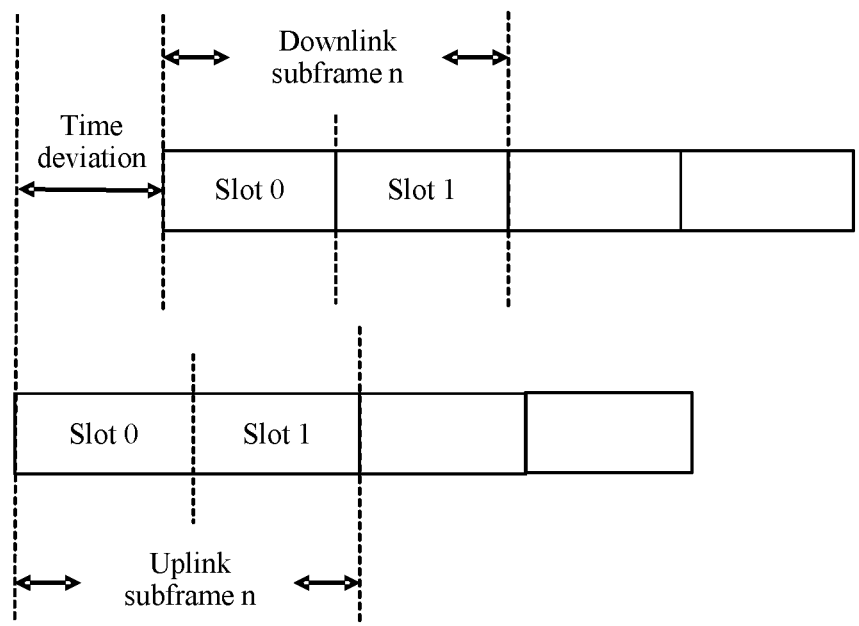
FIG. 4-a

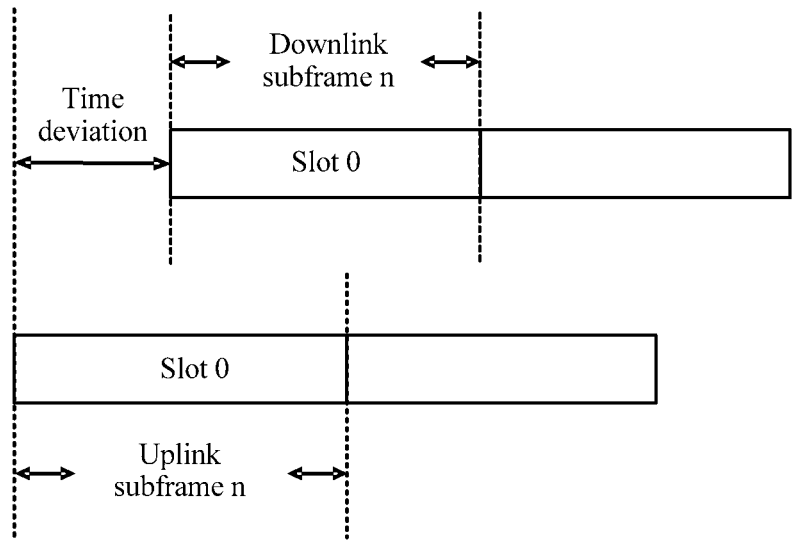
FIG. 4-b
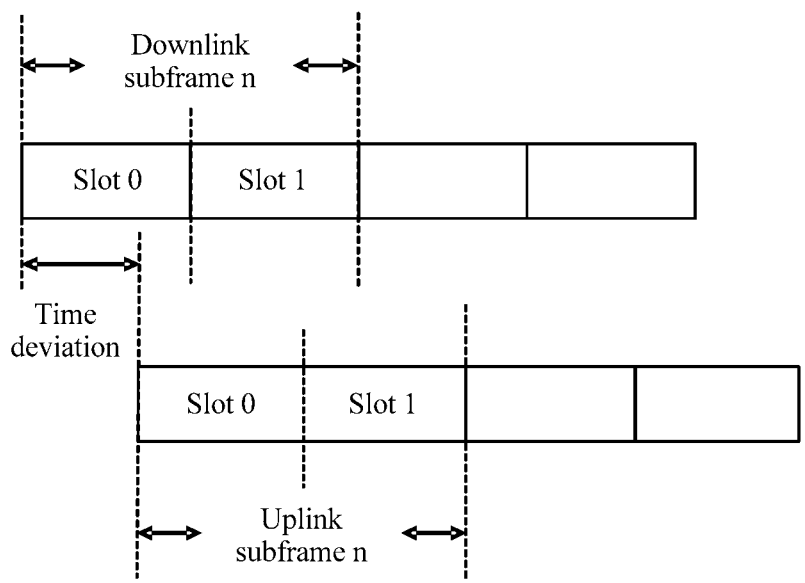
FIG. 5-a

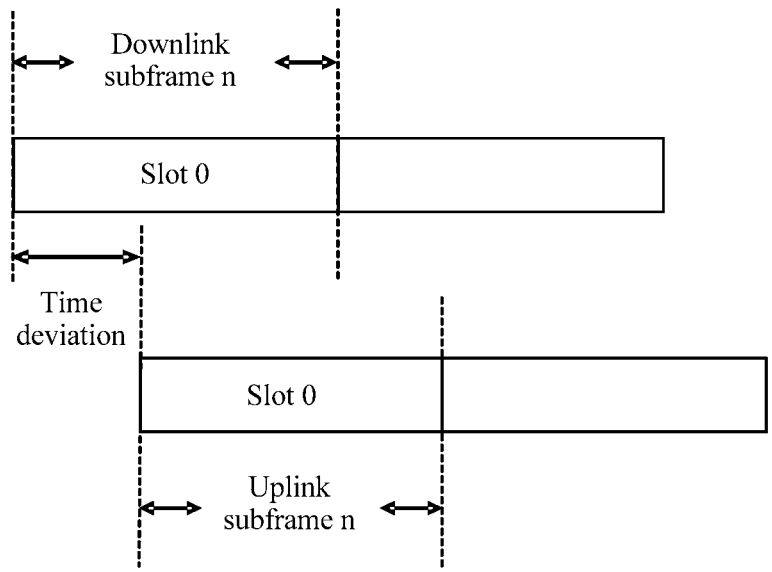
FIG. 5-b
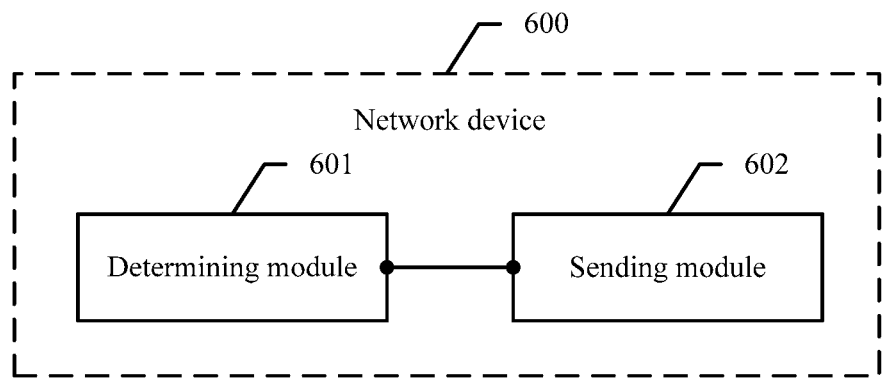
FIG. 6-a
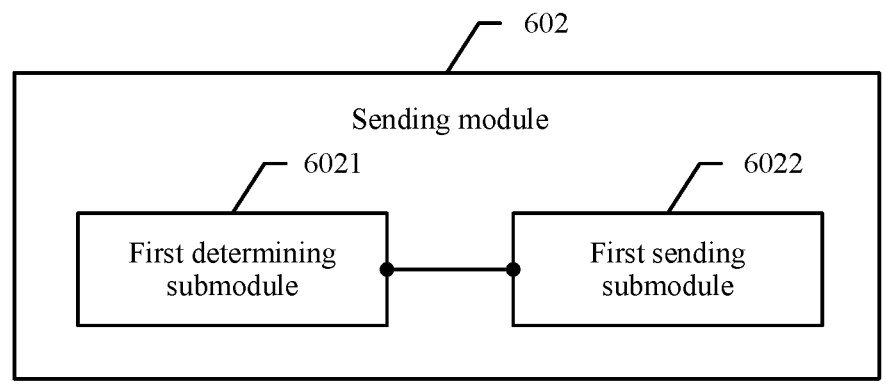
FIG. 6-b

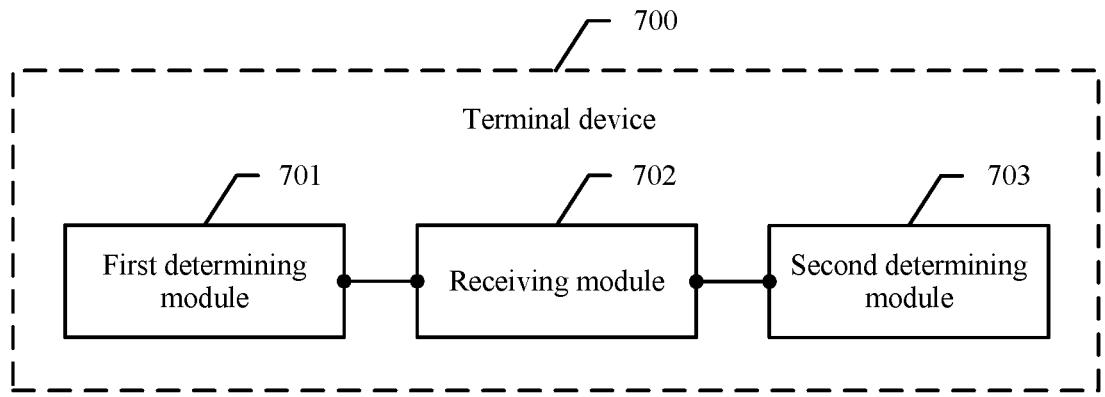
FIG. 7-a
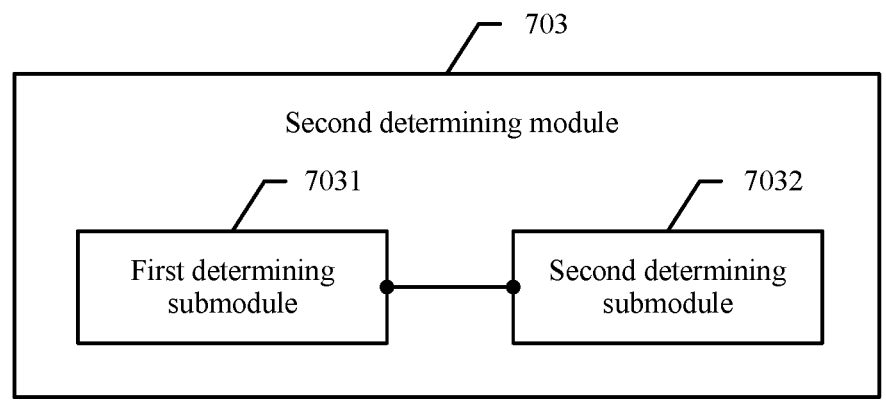
FIG. 7-b
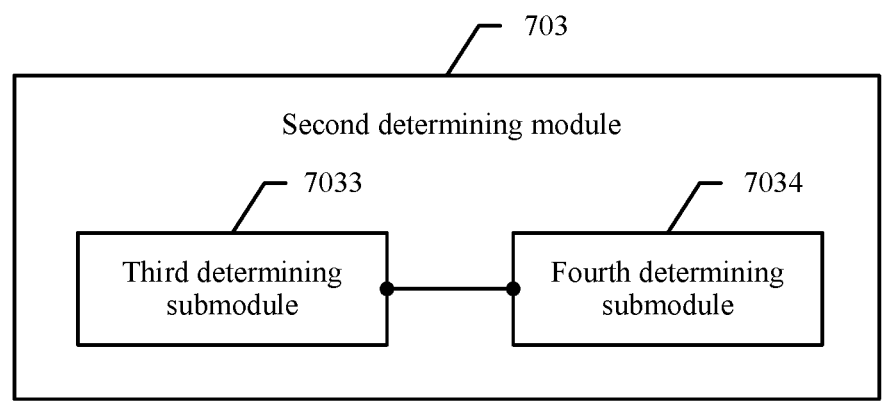
FIG. 7-c

DEVIATION-BASED INFORMATION TRANSMISSION METHOD, NETWORK DEVICE, AND TERMINAL DEVICE

CROSS-REFERENCE TO RELATED APPLICATIONS

This application is a continuation of International Application No. PCT/CN2018/091390, filed on Jun. 15, 2018, which claims priority to Chinese Patent Application No. 201710459305.2 filed on Jun. 16, 2017. The disclosures of the aforementioned applications are hereby incorporated by reference in their entireties.

TECHNICAL FIELD

This application relates to the field of communications technologies, and in particular, to an information sending method, an information receiving method, a network device, and a terminal device.

BACKGROUND

During development and evolution of wireless communications systems, both a 5th-generation mobile communications technology (5th-Generation, 5G) New Radio (New Radio interface, NR) system and a Long Term Evolution (Long Term Evolution, LTE) system may be deployed on a frequency band below 6 gigahertz (GigaHertz, GHz). Currently, the NR system is most likely to be first deployed in a frequency of 3.5 GHz. However, considering that uplink coverage and downlink coverage of the NR system that are at the frequency cannot match each other, that is, the downlink coverage is significantly larger than the uplink coverage, an uplink rate of the NR system is limited. Because uplink coverage and downlink coverage of the LTE system that are at a frequency of 1.8 GHz match each other, an uplink of the NR system may be deployed on an uplink frequency band at the frequency of 1.8 GHz. Therefore, the uplink coverage of the NR system can be enhanced so that both the LTE system and the NR system exist on an uplink frequency band of LTE. In other words, the NR system and the LTE system may share one uplink frequency band.

In the prior art, the LTE system usually works in a frequency division duplex (Frequency Division Duplex, FDD) mode at the frequency of 1.8 GHz, a plurality of eNodeBs in the LTE system cannot be synchronized, and there is a deviation. If a working frequency of the NR system is 3.5 GHz, the NR system needs to work in a time division duplex (Time Division Duplex, TDD) mode, so that different gNBs in the NR system need to be synchronized in terms of time, to avoid cross interference between cells. In this scenario, for a gNB in the NR system, there is a deviation between a sending start time of the gNB on a downlink frequency band and a receiving start time of the gNB on an uplink frequency band, and time deviations of different gNBs are different.

To enable a terminal device to determine a number of a frame, a subframe, and a slot for uplink sending, in the prior art, downlink transmission and uplink transmission are synchronized for the LTE system working in the FDD mode. Both an eNodeB and the terminal device determine an uplink subframe that is synchronized with a downlink subframe having a particular number (for example, the number is n) as an uplink subframe having the same number (namely, the number n). In a scenario in which the NR system and the LTE system share a same uplink frequency band, downlink transmission of the NR system cannot be synchronized with uplink transmission of the NR system. Consequently, the terminal device cannot determine a number of an uplink subframe based on a number of a downlink subframe.

In conclusion, the prior art has at least the following technical problem: When downlink transmission cannot be synchronized with uplink transmission, the terminal device cannot obtain a number of an uplink subframe, and consequently the terminal device cannot perform uplink transmission.

SUMMARY

Various embodiments provide an information sending method, an information receiving method, a network device, and a terminal device, to enable the terminal device to determine a correct uplink transmission time, thereby avoiding an uplink transmission failure.

To resolve the foregoing problem, the Various embodiments provide the following technical solutions:

According to a first aspect, an embodiment of this application provides an information sending method, including: determining, by a network device, a first receiving start time and a first sending start time, where the first receiving start time is a receiving time at which the network device starts to receive a signal in a first time period, and the first sending start time is a sending time at which the network device starts to send a signal in a second time period; and sending, by the network device, indication information to a terminal device, where the indication information is used to instruct the terminal device to determine a second sending start time, and the second sending start time is determined based on the first receiving start time and the first sending start time. In this embodiment of this application, because the network device may determine, by using the first receiving start time and the first sending start time, times respectively used for receiving a signal and sending a signal on a side of the network device, and may determine, by using the times respectively used for sending a signal and receiving a signal on the side of the network device, to send the indication information to the terminal device, so that the terminal device can determine the second sending start time based on the indication information of the network device. The second sending start time is determined based on the first receiving start time and the first sending start time. After determining the second sending start time, the terminal device may perform uplink transmission, thereby avoiding a transmission failure caused because a correct uplink transmission time cannot be determined.

In one embodiment, the first receiving start time is earlier than or equal to the first sending start time, a difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 millisecond ms. In the foregoing embodiment of this application, when the first receiving start time is earlier than or equal to the first sending start time, the difference between the first sending start time and the first receiving start time is greater than or equal to 0 and less than the duration of the first slot or the first subframe, so that the network device can determine, based on the relationship between the first sending start time and the first receiving start time, to send the indication information to the terminal device.

In one embodiment, the first sending start time is earlier than or equal to the first receiving start time, a difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms. In the foregoing embodiment of this application, when the first sending start time is earlier than or equal to the first receiving start time, the difference between the first receiving start time and the first sending start time is greater than or equal to 0 and less than duration of the first slot or the first subframe, so that the network device can determine, based on the relationship between the first receiving start time and the first sending start time, to send the indication information to the terminal device.

In one embodiment, a difference between the first sending start time and the first receiving start time is less than or equal to a threshold, and the difference is greater than a value obtained after the threshold is negated; or the difference is less than a threshold, and the difference is greater than or equal to a value obtained after the threshold is negated. In the foregoing embodiment of this application, the network device first determines the difference between the first sending start time and the first receiving start time, and the difference has two implementations: (1) the difference is less than or equal to the threshold, and the difference is greater than the value obtained after the threshold is negated; and (2) the difference is less than the threshold, and the difference is greater than or equal to the value obtained after the threshold is negated. In a scenario in which the difference between the first sending start time and the first receiving start time satisfies the two manners, the network device can determine, based on the relationship between the first receiving start time and the first sending start time, to send the indication information to the terminal device.

In one embodiment, content indicated by the indication information is determined by using a time deviation, and a value of the time deviation is equal to a difference between the first receiving start time and the first sending start time. In the foregoing embodiment of this application, for example, if the first sending start time is earlier than or equal to the first receiving start time, the time deviation may be equal to a value obtained by subtracting the first sending start time from the first receiving start time; or if the first receiving start time is earlier than or equal to the first sending start time, the time deviation may be equal to a value obtained by subtracting the first receiving start time from the first sending start time. The content indicated by the indication information determined by the network device is determined by using the time deviation, so that the network device can directly or indirectly indicate the time deviation to the terminal device, and the terminal device can correctly determine the second sending start time based on the content indicated by the network device.

In one embodiment, the sending, by the network device, indication information to a terminal device includes: sending, by the network device to the terminal device, the indication information carrying the time deviation, where the value of the time deviation is equal to the difference between the first receiving start time and the first sending start time. In the foregoing embodiment of this application, the network device may add a new field to the indication information to carry the time deviation; or the network device may use an original field in the indication information to carry the time deviation, for example, may use an original reserved field in the indication information to carry the time deviation, or may replace original data carried in the original field in the indication information with the time deviation. This is not limited herein. The network device sends, to the terminal device, the indication information carrying the time deviation, so that the terminal device can parse out the time deviation from the indication information, and the terminal device can obtain the second sending start time by using the time deviation.

In one embodiment, the sending, by the network device, indication information to a terminal device includes: determining, by the network device, a timing advance obtained when the terminal device accesses a cell of the network device; and sending, by the network device to the terminal device, the indication information carrying a total timing advance, where the total timing advance includes a sum of the timing advance and the time deviation, and the value of the time deviation is equal to the difference between the first receiving start time and the first sending start time. In the foregoing embodiment of this application, after the network device determines the total timing advance, the network device may send, to the terminal device, the indication information carrying the total timing advance. For example, the network device may add a new field to the indication information to carry the total timing advance; or the network device may use an original field in the indication information to carry the total timing advance, for example, may use an original reserved field in the indication information to carry the total timing advance, or may replace original data carried in the original field in the indication information with the total timing advance. The network device sends, to the terminal device, the indication information carrying the total timing advance, so that the terminal device can parse out the total timing advance from the indication information, and the terminal device can obtain the second sending start time by using the total timing advance.

In one embodiment, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number. In the foregoing embodiment of this application, if a subframe is a time period, the first time period may be the uplink subframe, that is, a receiving time at which the network device starts to receive a signal in the uplink subframe is defined as the first receiving start time; and the second time period may be the downlink subframe, that is, a sending time at which the network device starts to send a signal in the downlink subframe is defined as the first sending start time. The first time period and the second time period satisfy the following relationship: the uplink subframe and the downlink subframe have a same subframe number. When the uplink subframe and the downlink subframe have a same subframe number, the first receiving start time in the uplink subframe and the first sending start time in the downlink subframe may be determined. The first time period and the second time period satisfy the relationship of having a same subframe number, and therefore the network device can obtain receiving timing and sending timing respectively in the uplink subframe and the downlink subframe having a same subframe number.

In one embodiment, the uplink subframe and the downlink subframe belong to one or two frames having a same number; or the uplink slot and the downlink slot belong to one or two frames having a same number. In the foregoing embodiment of this application, the uplink subframe and the downlink subframe may belong to a same frame. For example, in a TDD mode, a frame may include an uplink subframe used by an uplink to transmit a signal and a downlink subframe used by a downlink to transmit a signal. For another example, the uplink subframe and the downlink subframe may belong to two frames, but the two frames have a same frame number. For example, in an FDD mode, the uplink subframe belongs to an uplink frame, and the downlink subframe belongs to a downlink frame, but the uplink frame and the downlink frame have a same frame number. Similarly, the uplink slot and the downlink slot may belong to a frame having a same number, or may belong to two frames having a same number.

According to a second aspect, an embodiment of this application provides an information receiving method, including: determining, by a terminal device, a second receiving start time, where the second receiving start time is a receiving time at which the terminal device starts to receive a signal from a network device in a third time period; receiving, by the terminal device, indication information from the network device based on the second receiving start time; and determining, by the terminal device, a second sending start time based on the second receiving start time and the indication information, where the second sending start time is a sending time at which the terminal device starts to send a signal in a fourth time period. In the foregoing embodiment of this application, the terminal device first determines the second receiving start time, and then the terminal device receives, based on the second receiving start time, the indication information sent by the network device. The terminal device may determine the second sending start time based on the indication information of the network device and the second receiving start time. After determining the second sending start time, the terminal device may perform uplink transmission, thereby avoiding a transmission failure caused because a correct uplink transmission time cannot be determined.

In one embodiment, the determining, by the terminal device, a second sending start time based on the second receiving start time and the indication information includes: determining, by the terminal device, a time deviation from the indication information, where a value of the time deviation is equal to a difference between a first receiving start time and a first sending start time, the first receiving start time is a receiving time at which the network device starts to receive a signal in a first time period, and the first sending start time is a sending time at which the network device starts to send a signal in a second time period; and determining, by the terminal device, the second sending start time based on the second receiving start time and the time deviation. In the foregoing embodiment of this application, the network device sends, to the terminal device, the indication information carrying the time deviation, so that the terminal device can parse out the time deviation from the indication information. The terminal device may obtain the second sending start time by using the time deviation and the second receiving start time. For example, when accessing a cell of the network device, the terminal device may receive a timing advance sent by the terminal device. The terminal device stores the timing advance. The terminal device uses the second receiving start time as a time axis starting point, and determines, based on the indication information sent by the network device, duration deviating from the time axis starting point as the time deviation. Then through deviation of one more timing advance, a specific time at which the terminal device sends a signal in the fourth time period can be obtained. In other words, a fourth sending start time can be obtained.

In one embodiment, the first receiving start time is earlier than or equal to the first sending start time, the difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 millisecond ms.

In one embodiment, the first sending start time is earlier than or equal to the first receiving start time, the difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

In one embodiment, the difference between the first sending start time and the first receiving start time is less than or equal to a preset threshold, and the difference is greater than a value obtained after the threshold is negated; or the difference is less than a threshold, and the difference is greater than or equal to a value obtained after the threshold is negated.

In one embodiment, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number.

In one embodiment, the uplink subframe and the downlink subframe belong to one or two frames having a same number; or the uplink slot and the downlink slot belong to one or two frames having a same number.

For a description of a relationship satisfied by the first receiving start time and first sending start time and a description of a relationship between the first time period and the second time period in the foregoing embodiment of this application, refer to the example descriptions in the first aspect.

In one embodiment, the determining, by the terminal device, a second sending start time based on the second receiving start time and the indication information includes: determining, by the terminal device, a total timing advance from the indication information; and determining, by the terminal device, the second sending start time based on the second receiving start time and the total timing advance. In the foregoing embodiment of this application, after the network device determines the total timing advance, the network device may send, to the terminal device, the indication information carrying the total timing advance, so that the terminal device can obtain the total timing advance by parsing the indication information. It can be learned from the example descriptions in the foregoing embodiment that the total timing advance includes a sum of the timing advance and the time deviation, and the terminal device may obtain the second sending start time by using the total timing advance and the second receiving start time.

According to a third aspect, an embodiment of this application provides a network device, including: a determining module, configured to determine a first receiving start time and a first sending start time, where the first receiving start time is a receiving time at which the network device starts to receive a signal in a first time period, and the first sending start time is a sending time at which the network device starts to send a signal in a second time period; and a sending module, configured to send indication information to a terminal device, where the indication information is used to instruct the terminal device to determine a second sending start time, and the second sending start time is determined based on the first receiving start time and the first sending start time. In this embodiment of this application, because the network device may determine, by using the first receiving start time and the first sending start time, times respectively used for receiving a signal and sending a signal on a side of the network device, and may determine, by using the times respectively used for sending a signal and receiving a signal on the side of the network device, to send the indication information to the terminal device, so that the terminal device can determine the second sending start time based on the indication information of the network device. The second sending start time is determined based on the first receiving start time and the first sending start time. After determining the second sending start time, the terminal device may perform uplink transmission, thereby avoiding a transmission failure caused because a correct uplink transmission time cannot be determined.

In the third aspect of the present invention, the composition modules of the network device may further perform the steps described in the first aspect and the possible implementations. For details, refer to the descriptions of the first aspect and the possible implementations.

According to a fourth aspect, an embodiment of this application provides a terminal device, including: a first determining module, configured to determine a second receiving start time, where the second receiving start time is a receiving time at which the terminal device starts to receive a signal from a network device in a third time period; a receiving module, configured to receive indication information from the network device based on the second receiving start time; and a second determining module, configured to determine a second sending start time based on the second receiving start time and the indication information, where the second sending start time is a sending time at which the terminal device starts to send a signal in a fourth time period. In the foregoing embodiment of this application, the terminal device first determines the second receiving start time, and then the terminal device receives, based on the second receiving start time, the indication information sent by the network device. The terminal device may determine the second sending start time based on the indication information of the network device and the second receiving start time. After determining the second sending start time, the terminal device may perform uplink transmission, thereby avoiding a transmission failure caused because a correct uplink transmission time cannot be determined.

In the fourth aspect of the present invention, the composition modules of the terminal device may further perform the steps described in the second aspect and the possible implementations. For details, refer to the descriptions of the second aspect and the possible implementations.

According to a fifth aspect, an embodiment of this application further provides a network device, and the network device includes a processor, a memory, a communications interface, and a bus. The processor, the communications interface, and the memory communicate with one another by using the bus; the communications interface is configured to receive and send data; the memory is configured to store an instruction; and the processor is configured to execute the instruction in the memory, to perform the method in any item of the first aspect. In the foregoing embodiment of this application, because the network device may determine, by using the first receiving start time and the first sending start time, times respectively used for receiving a signal and sending a signal on a side of the network device, and may determine, by using the times respectively used for sending a signal and receiving a signal on the side of the network device, to send the indication information to the terminal device, so that the terminal device can determine the second sending start time based on the indication information of the network device. The second sending start time is determined based on the first receiving start time and the first sending start time. After determining the second sending start time, the terminal device may perform uplink transmission, thereby avoiding a transmission failure caused because a correct uplink transmission time cannot be determined.

According to a sixth aspect, an embodiment of this application further provides a terminal device, and the terminal device includes a processor, a memory, a communications interface, and a bus. The processor, the communications interface, and the memory communicate with one another by using the bus; the communications interface is configured to receive and send data; the memory is configured to store an instruction; and the processor is configured to execute the instruction in the memory, to perform the method in any item of the second aspect. In the foregoing embodiment of this application, the terminal device first determines the second receiving start time, and then the terminal device receives, based on the second receiving start time, the indication information sent by the network device. The terminal device may determine the second sending start time based on the indication information of the network device and the second receiving start time. After determining the second sending start time, the terminal device may perform uplink transmission, thereby avoiding a transmission failure caused because a correct uplink transmission time cannot be determined.

A seventh aspect of this application provides a computer-readable storage medium. The computer-readable storage medium stores an instruction, and when the instruction is run on a computer, the computer perform the method in each of the foregoing aspects.

An eighth aspect of this application provides a computer program product including an instruction. When the instruction is run on a computer, the computer performs the method in each of the foregoing aspects.

DESCRIPTION OF DRAWINGS

FIG. 1 is a schematic diagram of a composition architecture of a communications system according to an embodiment of this application;

FIG. 2 is a schematic block diagram of a procedure of an information sending method according to an embodiment of this application;

FIG. 3 is a schematic block diagram of a procedure of an information receiving method according to an embodiment of this application;

FIG. 4-a is a schematic diagram of a timing relationship between an uplink subframe and a downlink subframe according to an embodiment of this application;

FIG. 4-*b* is a schematic diagram of another timing relationship between an uplink subframe and a downlink subframe according to an embodiment of this application;

FIG. 5-*a* is a schematic diagram of another timing relationship between an uplink subframe and a downlink subframe according to an embodiment of this application;

FIG. 5-*b* is a schematic diagram of another timing relationship between an uplink subframe and a downlink subframe according to an embodiment of this application;

FIG. 6-*a* is a schematic structural composition diagram of a network device according to an embodiment of this application;

FIG. 6-*b* is a schematic structural composition diagram of a sending module according to an embodiment of this application;

FIG. 7-*a* is a schematic structural composition diagram of a terminal device according to an embodiment of this application;

FIG. 7-*b* is a schematic structural composition diagram of a second determining module according to an embodiment of this application;

FIG. 7-*c* is a schematic structural composition diagram of another second determining module according to an embodiment of this application;

DESCRIPTION OF EMBODIMENTS

Figure 8:
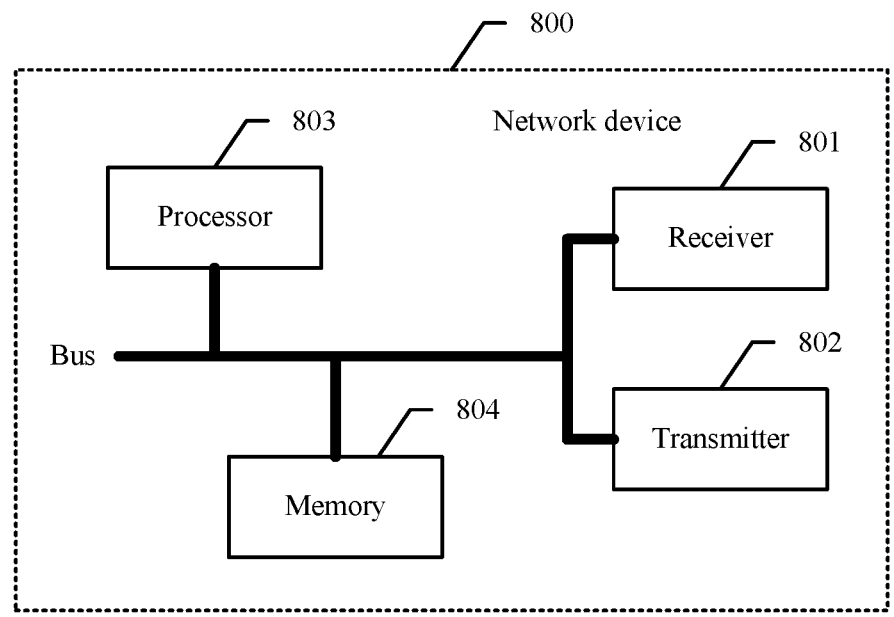
FIG. 8 is a schematic structural composition diagram of another network device according to an embodiment of this application.

The Various embodiments provide an information sending method, an information receiving method, a network device, and a terminal device, to enable the terminal device to determine a correct uplink transmission time, thereby avoiding an uplink transmission failure.

The following describes various embodiments with reference to accompanying drawings.

In the specification, claims, and accompanying drawings of this application, the terms "first", "second", and so on are intended to distinguish between similar objects but do not necessarily indicate a specific order or sequence. It should be understood that the terms used in such a way are interchangeable in proper circumstances, which is merely a discrimination manner that is used when objects having a same attribute are described in the Various embodiments. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Details are described below separately.

FIG. 1 is a schematic architectural composition diagram of a communications system according to an embodiment of this application. The communications system provided in this embodiment of this application may include a network device and a terminal device. The network device is a party for managing a communication resource and providing a communication service in a communication process. For example, the network device may be a base station, or may be a device such as a server that provides a communication service. The terminal device is a party that uses a communication resource in a communication process. For example, the terminal device may be a mobile phone terminal or an intelligent mobile terminal. The communications system in this embodiment of this application is mainly a wireless communications system, and in particular, is a communications system in which timing of a downlink frequency band and that of an uplink frequency band are asynchronized. "Timing" in this embodiment of this application means being based on a specified time. As shown in FIG. 1, the network device sends a downlink signal to the terminal device on a first frequency band by using a downlink subframe n, the network device receives, on a second frequency band by using an uplink subframe n, an uplink signal sent by the terminal device, and sending timing of the network device on the first frequency band and receiving timing of the network device on the second frequency band are not synchronized.

Uplink and downlink transmission between the network device and the terminal device may be completed by using an LTE system or an NR system. In a scenario in which downlink sending and uplink receiving at a network device end cannot be synchronized, a number of a subframe for uplink receiving cannot be obtained in a manner in an uplink and downlink synchronization scenario in the prior art. For example, it is considered that in a communication scheduling and feedback process, the terminal device needs to determine a number of a frame, a subframe, and a slot for uplink sending, to meet requirements of scheduling and feedback time sequences. Because there is a deviation between downlink sending and uplink receiving of the network device, and a value of the deviation cannot be determined in the prior art, the terminal device cannot determine a number of an uplink subframe based on a number of a downlink subframe. To resolve the foregoing problem, an information sending method and an information receiving method in the Various embodiments are provided. Detailed descriptions are separately provided below from a network device side and a terminal device side by using examples.

First, FIG. 2 shows an embodiment of an information sending method according to an embodiment of this application, and the method may be applied to the network device side in the foregoing communications system. The method may include the following steps.

201. A network device determines a first receiving start time and a first sending start time, where the first receiving start time is a receiving time at which the network device starts to receive a signal in a first time period, and the first sending start time is a sending time at which the network device starts to send a signal in a second time period.

In this embodiment of this application, the network device and a terminal device may receive and send signals by using wireless communication resources. The network device determines the receiving time at which the network device starts to receive a signal in the first time period. The network device starts to receive, in the first time period, an uplink signal sent by the terminal device. For ease of description, the receiving start time in this case is defined as the "first receiving start time". The first receiving start time is receiving timing of the network device in the first time period. In this embodiment of this application, the "timing" is a sending start time or a receiving start time. The first time period is a time period in which the network device receives a signal, and does not need to be any specific time period. In other words, in this embodiment of this application, the first time period may be any time period in which the network device performs uplink transmission.

In this embodiment of this application, in addition to determining the first receiving start time, the network device may determine the sending time at which the network device starts to send a signal in the second time period. The network device starts to send a downlink signal to the terminal device in the second time period. For ease of description, the sending start time in this case is defined as the "first sending start time". The first sending start time is sending timing of the network device in the second time period. In this embodiment of this application, the "timing" is a sending start time or a receiving start time. The second time period is a time period in which the network device sends a signal, and does not need to be any specific time period.

In the foregoing embodiment of this application, the network device may determine the first receiving start time and the first sending start time, so that the network device can determine, by using the first receiving start time and the first sending start time, times respectively used for receiving a signal and sending a signal on a side of the network device, and may determine, by using the times respectively used for sending a signal and receiving a signal on the side of the network device, how to perform indication to the terminal device, so that the terminal device can determine a second sending start time based on an indication of the network device. The second sending start time is a sending time at which the terminal device starts to send a signal in a fourth time period.

It should be noted that in the foregoing embodiment of this application, duration of a time period may be a subframe, or may be a slot. One subframe may include one or more slots, and different subframes may further include different quantities of slots.

In some Various embodiments, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number.

If a subframe is a time period, the first time period may be the uplink subframe, that is, a receiving time at which the network device starts to receive a signal in the uplink subframe is defined as the first receiving start time; and the second time period may be the downlink subframe, that is, a sending time at which the network device starts to send a signal in the downlink subframe is defined as the first sending start time. The first time period and the second time period satisfy the following relationship: the uplink subframe and the downlink subframe have a same subframe number. Therefore, a scenario to which step 201 is applied may be how to determine the first receiving start time in the uplink subframe and the first sending start time in the downlink subframe when the uplink subframe and the downlink subframe have a same subframe number. The first time period and the second time period satisfy the relationship of having a same subframe number, and therefore the network device can obtain receiving timing and sending timing respectively in the uplink subframe and the downlink subframe having a same subframe number. It should be noted that in some Various embodiments, one subframe includes at least one slot, that is, some subframes may each include a plurality of slots. For example, a quantity of slots included in one downlink subframe may be different from a quantity of slots included in one uplink subframe.

In the foregoing embodiment of this application, a slot may also be a time period. In this case, the first time period may be an uplink slot, that is, a receiving time at which the network device starts to receive a signal in the uplink slot is defined as the first receiving start time; and the second time period may be a downlink slot, that is, a sending time at which the network device starts to send a signal in the downlink slot is defined as the first sending start time. The first time period and the second time period satisfy the following relationship: the uplink slot and the downlink slot have a same slot number. Therefore, a scenario to which step 201 is applied may be how to determine the first receiving start time in the uplink slot and the first sending start time in the downlink slot when the uplink slot and the downlink slot have a same slot number. The first time period and the second time period satisfy the relationship of having a same slot number, and therefore the network device can obtain receiving timing and sending timing respectively in the uplink slot and the downlink slot having a same slot number.

Further, in some Various embodiments, the uplink subframe and the downlink subframe belong to one or two frames having a same number; or the uplink slot and the downlink slot belong to one or two frames having a same number.

The uplink subframe and the downlink subframe may belong to a same frame. For example, in a TDD mode, a frame may include an uplink subframe used by an uplink to transmit a signal and a downlink subframe used by a downlink to transmit a signal. For another example, the uplink subframe and the downlink subframe may belong to two frames, but the two frames have a same frame number. For example, in an FDD mode, the uplink subframe belongs to an uplink frame, and the downlink subframe belongs to a downlink frame, but the uplink frame and the downlink frame have a same frame number. Similarly, the uplink slot and the downlink slot may belong to a frame having a same number, or may belong to two frames having a same number.

In some Various embodiments, the first receiving start time and the first sending start time that are determined by the network device may have the following relationship: the first receiving start time is earlier than or equal to the first sending start time, a difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 millisecond (millisecond, ms).

In some embodiments, the network device may first select a time that is earlier on a time axis from the first receiving start time and the first sending start time. If the first receiving start time is earlier than or equal to the first sending start time, a time at which the network device starts to receive a signal in the first time period is not later than a time at which the network device starts to send a signal in the second time period. If the first receiving start time is equal to the first sending start time, it indicates that the network device starts to receive a signal in the first time period and starts to send a signal in the second time period at a same time. The network device may subtract the first receiving start time from the first sending start time to obtain a first timing advance. A value of the first timing advance is greater than or equal to 0 and less than the duration of the first slot or the first subframe. The first timing advance may indicate the difference between the first sending start time and the first receiving start time. The network device may determine, based on the first timing advance, the difference having the following value range: the difference is greater than or equal to 0 and less than the duration of the first slot or the first subframe. When the first receiving start time is earlier than or equal to the first sending start time, the difference between the first sending start time and the first receiving start time is greater than or equal to 0 and less than the duration of the first slot or the first subframe, so that the network device can determine, based on the relationship between the first sending start time and the first receiving start time, to send indication information to the terminal device.

There may be a plurality of implementations for the first slot and the first subframe. Examples are used below for description. The first slot may include a slot corresponding to a minimum subcarrier spacing used by the network device to send or receive a signal, or a slot corresponding to a subcarrier spacing of 15 KHz. The first slot may be a slot corresponding to a minimum subcarrier spacing supported by a wireless communications system. The minimum subcarrier used by the network device to send or receive a signal varies as the wireless communications system varies. For example, the minimum subcarrier may be 15 KHz. Unlimitedly, as the wireless communications system evolves, the minimum subcarrier used by the network device to send or receive a signal may also have a smaller frequency value. This is not limited herein. In an NR system provided in this embodiment of this application, a value of the duration of the first subframe is 1 ms. It may be understood that the value of the first subframe may further be updated based on evolution of the wireless communications system.

In some other embodiments, the first receiving start time and the first sending start time that are determined by the network device may have the following relationship: the first sending start time is earlier than or equal to the first receiving start time, a difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

In some embodiments, the network device may first select a time that is earlier on a time axis from the first receiving start time and the first sending start time. If the first sending start time is earlier than or equal to the first receiving start time, a time at which the network device starts to send a signal in the second time period is not later than a time at which the network device starts to receive a signal in the first time period. If the first sending start time is equal to the first receiving start time, it indicates that the network device starts to send a signal in the second time period and starts to receive a signal in the first time period at a same time. The network device may subtract the first sending start time from the first receiving start time to obtain a second timing advance. A value of the second timing advance is greater than or equal to 0 and less than the duration of the first slot or the first subframe. The second timing advance may indicate the difference between the first receiving start time and the first sending start time. The network device may determine, based on the second timing advance, the difference having the following value range: the difference is greater than or equal to 0 and less than the duration of the first slot or the first subframe. When the first sending start time is earlier than or equal to the first receiving start time, the difference between the first receiving start time and the first sending start time is greater than or equal to 0 and less than the duration of the first slot or the first subframe, so that the network device can determine, based on the relationship between the first receiving start time and the first sending start time, to send indication information to the terminal device.

There may be a plurality of implementations for the first slot and the first subframe. Examples are used below for description. The first slot may include a slot corresponding to a minimum subcarrier spacing used by the network device to send or receive a signal, or a slot corresponding to a subcarrier spacing of 15 KHz. The first slot may be a slot corresponding to a minimum subcarrier spacing supported by a wireless communications system. The minimum subcarrier used by the network device to send or receive a signal varies as the wireless communications system varies. For example, the minimum subcarrier may be 15 KHz. Unlimitedly, as the wireless communications system evolves, the minimum subcarrier used by the network device to send or receive a signal may also have a smaller frequency value. This is not limited herein. In an NR system provided in this embodiment of this application, a value of the duration of the first subframe may be 1 ms. Unlimitedly, the value of the first subframe may continuously be updated based on evolution of the wireless communications system.

In various embodiments, the first receiving start time and the first sending start time that are determined by the network device may have the following relationship: a difference between the first sending start time and the first receiving start time is less than or equal to a threshold, and the difference is greater than a value obtained after the threshold is negated; or the difference is less than a threshold, and the difference is greater than or equal to a value obtained after the threshold is negated.

The network device first determines the difference between the first sending start time and the first receiving start time, and the difference has two implementations: (1) the difference is less than or equal to the threshold, and the difference is greater than the value obtained after the threshold is negated; and (2) the difference is less than the threshold, and the difference is greater than or equal to the value obtained after the threshold is negated. For example, a letter a is used to indicate the threshold, −a is used to indicate the value obtained after the threshold is negated, and a letter b is used to indicate the difference between the first sending start time and the first receiving start time. In this case, a and b satisfy the following relationship: −a<b≤a; or a and b satisfy the following relationship: −a≤b<a. In a scenario in which the difference between the first sending start time and the first receiving start time satisfies the two manners, the network device can determine, based on the relationship between the first receiving start time and the first sending start time, to send indication information to the terminal device.

It should be noted that in the foregoing embodiment, the threshold may have a plurality of specific values. For example, a value of the threshold may be less than a value of the duration of the first slot, or less than a value of the duration of the first subframe. The first slot includes a slot corresponding to a minimum subcarrier spacing used by the network device to send or receive a signal, or a slot corresponding to a subcarrier spacing of 15 KHz. The duration of the first subframe is 1 ms. For example, the value of the threshold may be half of the duration of the first slot or half of the duration of the first subframe. For another example, the value of the threshold may be one-third of the duration of the first slot, or a quarter of the duration of the first subframe, or the like. Unlimitedly, the value of the threshold may be continuously updated based on evolution of the wireless communications system.

202. The network device sends the indication information to the terminal device, where the indication information is used to instruct the terminal device to determine the second sending start time, and the second sending start time is determined based on the first receiving start time and the first sending start time.

In this embodiment, after the network device determines the first receiving start time and the first sending start time, the network device may send the indication information to the terminal device. For example, the network device may send the indication information to the terminal device through a downlink. The indication information may be used to instruct the terminal device to determine the second sending start time. Indication content included in the indication information sent by the network device is related to the first receiving start time and the first sending start time. The network device may determine the second sending start time based on the first receiving start time and the first sending start time. The second sending start time may be defined as a sending time at which the terminal device starts to send a signal in a fourth time period. After determining the second sending start time, the terminal device may perform uplink transmission, thereby avoiding a transmission failure caused because a correct uplink transmission time cannot be determined.

In various embodiments, the content indicated by the indication information is determined by using a time deviation, and a value of the time deviation is equal to a difference between the first receiving start time and the first sending start time. The content indicated by the indication information sent by the network device may be determined by the network device based on the time deviation. The value of the time deviation is equal to the difference between the first receiving start time and the first sending start time. For example, if the first sending start time is earlier than or equal to the first receiving start time, the time deviation may be equal to a value obtained by subtracting the first sending start time from the first receiving start time; or if the first receiving start time is earlier than or equal to the first sending start time, the time deviation may be equal to a value obtained by subtracting the first receiving start time from the first sending start time. The content indicated by the indication information determined by the network device is determined by using the time deviation, so that the network device can directly or indirectly indicate the time deviation to the terminal device, and the terminal device can correctly determine the second sending start time based on the content indicated by the network device.

In various embodiments, step 202 of sending, by the network device, the indication information to the terminal device includes the following:

A1. The network device sends, to the terminal device, the indication information carrying the time deviation. The value of the time deviation is equal to the difference between the first receiving start time and the first sending start time.

The network device may add a new field to the indication information to carry the time deviation; or the network device may use an original field in the indication information to carry the time deviation, for example, may use an original reserved field in the indication information to carry the time deviation, or may replace original data carried in the original field in the indication information with the time deviation. This is not limited herein. The network device sends, to the terminal device, the indication information carrying the time deviation, so that the terminal device can parse out the time deviation from the indication information, and the terminal device can obtain the second sending start time by using the time deviation.

In various embodiments, step 202 of sending, by the network device, the indication information to the terminal device includes the following:

B1. The network device determines a timing advance obtained when the terminal device accesses a cell of the network device.

B2. The network device sends, to the terminal device, the indication information carrying a total timing advance. The total timing advance includes a sum of the timing advance and the time deviation, and the value of the time deviation is equal to the difference between the first receiving start time and the first sending start time.

A value of the timing advance is related to a distance between the terminal device and the network device. The timing advance may be obtained when the terminal device accesses the cell of the network device. The network device may perform a measurement process when the terminal device accesses the cell, so as to obtain the timing advance. The network device may determine the total timing advance by using the timing advance and the time deviation. The total timing advance includes the sum of the timing advance and the time deviation. For example, the total timing advance may be equal to the sum of the timing advance and the time deviation, or the total timing advance may be obtained by multiplying a correction amount by the sum of the timing advance and the time deviation after the sum is calculated. This is not limited herein. After the network device determines the total timing advance, the network device may send, to the terminal device, the indication information carrying the total timing advance. For example, the network device may add a new field to the indication information to carry the total timing advance; or the network device may use an original field in the indication information to carry the total timing advance, for example, may use an original reserved field in the indication information to carry the total timing advance, or may replace original data carried in the original field in the indication information with the total timing advance. The network device sends, to the terminal device, the indication information carrying the total timing advance, so that the terminal device can parse out the total timing advance from the indication information, and the terminal device can obtain the second sending start time by using the total timing advance.

In various embodiments, in an implementation scenario of performing step A1, the information sending method provided in this embodiment of this application may further include the following:

C1. The network device determines a timing advance obtained when the terminal device accesses a cell of the network device.

C2. The network device sends, to the terminal device, second indication information carrying the timing advance.

The indication information that carries the time deviation and that is sent by the network device in step A1 may be defined as first indication information. The network device may perform a measurement process when the terminal device accesses the cell, so as to obtain the timing advance. The network device sends, to the terminal device, the second indication information carrying the timing advance, so that the terminal device receives two pieces of indication information from the network device. The terminal device may parse out the time deviation and the timing advance from the two pieces of indication information by using the two pieces of indication information. The terminal device may obtain the second sending start time by using the time deviation and the timing advance.

In various embodiments, before step 202 of sending, by the network device, first indication information to the terminal device, in addition to the foregoing steps, the information sending method provided in this embodiment of this application may include the following:

D1. The network device determines the time deviation based on the first receiving start time and the first sending start time.

The network device may determine the first receiving start time and the first sending start time in step 201. The network device may obtain the difference between the first receiving start time and the first sending start time by performing subtraction. The difference is the time deviation. The network device may add the time deviation to the indication information, or the content indicated by the indication information sent by the network device is determined by using the time deviation.

It can be learned from the example descriptions of this embodiment of this application in the foregoing content that the network device determines the first receiving start time and the first sending start time. The first receiving start time is the receiving time at which the network device starts to receive a signal in the first time period, and the first sending start time is the sending time at which the network device starts to send a signal in the second time period. The network device sends the indication information to the terminal device. The indication information is used to instruct the terminal device to determine the second sending start time, and the second sending start time is determined based on the first receiving start time and the first sending start time. Because the network device may determine, by using the first receiving start time and the first sending start time, times respectively used for receiving a signal and sending a signal on a side of the network device, and may determine, by using the times respectively used for sending a signal and receiving a signal on the side of the network device, to send the indication information to the terminal device, so that the terminal device can determine the second sending start time based on the indication information of the network device. The second sending start time is determined based on the first receiving start time and the first sending start time. After determining the second sending start time, the terminal device may perform uplink transmission, thereby avoiding a transmission failure caused because a correct uplink transmission time cannot be determined.

In the foregoing embodiment, the information sending method provided in various embodiments is described from the side of the network device. The information receiving method provided in the Various embodiments is described below from the side of the terminal device. Referring to FIG. 3, the information receiving method includes the following steps.

301. The terminal device determines a second receiving start time, where the second receiving start time is a receiving time at which the terminal device starts to receive a signal from the network device in a third time period.

In this embodiment of this application, the network device and the terminal device may receive and send signals by using wireless communication resources. The terminal device first determines the receiving time at which the terminal device starts to receive a signal in the third time period. The terminal device starts to receive, in the third time period, a downlink signal sent by the network device. For ease of description, the receiving start time in this case is defined as the "second receiving start time". The second receiving start time is receiving timing of the terminal device in the third time period. In this embodiment of this application, the "timing" is a sending start time or a receiving start time. The third time period is a time period in which the terminal device receives a signal, and does not need to be any specific time period. In other words, in this embodiment of this application, the third time period may be any time period in which the terminal device performs downlink transmission.

It should be noted that in the foregoing embodiment of this application, duration of a time period may be a subframe, or may be a slot. One subframe may include one or more slots, and different subframes may further include different quantities of slots.

In various embodiments, the third time period includes a downlink subframe, a fourth time period includes an uplink subframe, and the uplink subframe and the downlink subframe have a same subframe number; or the third time period includes a downlink slot, the fourth time period includes an uplink slot, and the uplink slot and the downlink slot have a same slot number.

If a subframe is a time period, the third time period may be the downlink subframe, that is, a receiving time at which the terminal device starts to receive a signal in the downlink subframe is defined as the second receiving start time; and the fourth time period may be the uplink subframe, that is, a sending time at which the terminal device starts to send a signal in the uplink subframe is defined as a second sending start time. The third time period and the fourth time period satisfy the following relationship: The uplink subframe and the downlink subframe have a same subframe number. Therefore, a scenario to which step 201 is applied may be how to determine first receiving start time in the downlink subframe when the uplink subframe and the downlink subframe have a same subframe number. The third time period and the fourth time period satisfy the relationship of having a same subframe number, and therefore the terminal device may first obtain receiving timing of the downlink subframe, and then determine, with reference to indication information sent by the network device, sending timing of the uplink subframe having the same subframe number as the downlink subframe. For details, refer to subsequent descriptions of step 303 in this embodiment. It should be noted that in some Various embodiments, one subframe includes at least one slot, that is, some subframes may each include a plurality of slots. For example, a quantity of slots included in one downlink subframe may be different from a quantity of slots included in one uplink subframe.

In the foregoing embodiment, a slot may also be a time period. In this case, the third time period may be the downlink slot, and the fourth time period may be the uplink slot. The third time period and the fourth time period satisfy the relationship of having a same slot number. The terminal device may first obtain sending timing of the downlink slot, and then determine, with reference to indication information sent by the network device, sending timing of the uplink subframe having the same subframe number as the downlink subframe.

Further, in some Various embodiments, the uplink subframe and the downlink subframe belong to one or two frames having a same number; or the uplink slot and the downlink slot belong to one or two frames having a same number.

The uplink subframe and the downlink subframe may belong to a same frame. For example, in a TDD mode, a frame may include an uplink subframe used by an uplink to transmit a signal and a downlink subframe used by a downlink to transmit a signal. For another example, the uplink subframe and the downlink subframe may belong to two frames, but the two frames have a same frame number. For example, in an FDD mode, the uplink subframe belongs to an uplink frame, and the downlink subframe belongs to a downlink frame, but the uplink frame and the downlink frame have a same frame number. Similarly, the uplink slot and the downlink slot may belong to a frame having a same number, or may belong to two frames having a same number.

In various embodiments, step 301 of determining, by the terminal device, a second receiving start time includes the following:

E1. The terminal device determines the second receiving start time based on a synchronization signal received from the network device.

The terminal device may receive the synchronization signal sent by the network device. The terminal device determines the second receiving start time based on the synchronization signal. The synchronization signal may be transmitted between the network device and the terminal device in a plurality of manners. For example, the network device may broadcast the synchronization signal to the terminal device.

302. The terminal device receives the indication information from the network device based on the second receiving start time.

In this embodiment of this application, after the terminal device determines the second receiving start time, the terminal device may receive, by using the second receiving start time, the indication information sent by the network device. The terminal device may parse the indication information to obtain indication content carried in the indication information.

303. The terminal device determines the second sending start time based on the second receiving start time and the indication information, where the second sending start time is a sending time at which the terminal device starts to send a signal in the fourth time period.

In this embodiment, after the terminal device respectively obtains the second receiving start time and the indication information in step 301 and step 302, the terminal device determines the second sending start time based on the second receiving start time and the indication information. The second sending start time is the sending time at which the terminal device starts to send a signal in the fourth time period. The indication content included in the indication information sent by the network device is related to the first receiving start time and the first sending start time. The terminal device may determine the second sending start time by using the indication information sent by the network device and the second receiving start time determined by the terminal device. For example, the terminal device uses the second receiving start time as a time axis starting point, and determines, based on the indication information sent by the network device, specific duration deviating from the time axis starting point, so that a specific time at which the terminal device sends a signal in the fourth time period may be obtained. In other words, a fourth sending start time may be obtained. After determining the second sending start time, the terminal device may perform uplink transmission, thereby avoiding a transmission failure caused because a correct uplink transmission time cannot be determined.

In various embodiments, step 303 of determining, by the terminal device, the second sending start time based on the second receiving start time and the indication information includes the following:

F1. The terminal device determines a time deviation from the indication information, where a value of the time deviation is equal to a difference between a first receiving start time and a first sending start time, the first receiving start time is a receiving time at which the network device starts to receive a signal in a first time period, and the first sending start time is a sending time at which the network device starts to send a signal in a second time period.

F2. The terminal device determines the second sending start time based on the second receiving start time and the time deviation.

The network device sends, to the terminal device, the indication information carrying the time deviation, so that the terminal device can parse out the time deviation from the indication information. The terminal device may obtain the second sending start time by using the time deviation and the second receiving start time. For example, when accessing a cell of the network device, the terminal device may receive a timing advance sent by the terminal device. The terminal device stores the timing advance. The terminal device uses the second receiving start time as a time axis starting point, and determines, based on the indication information sent by the network device, duration deviating from the time axis starting point as the time deviation. Then through deviation of one more timing advance, a specific time at which the terminal device sends a signal in the fourth time period can be obtained. In other words, a fourth sending start time can be obtained. A manner in which the terminal device parses each field in the indication information is not limited.

In some Various embodiments, the first receiving start time is earlier than or equal to the first sending start time, the difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

Specifically, the network device may first select a time that is earlier on a time axis from the first receiving start time and the first sending start time. If the first receiving start time is earlier than or equal to the first sending start time, a time at which the network device starts to receive a signal in the first time period is not later than a time at which the network device starts to send a signal in the second time period. If the first receiving start time is equal to the first sending start time, it indicates that the network device starts to receive a signal in the first time period and starts to send a signal in the second time period at a same time. The network device may subtract the first receiving start time from the first sending start time to obtain a first timing advance. A value of the first timing advance is greater than or equal to 0 and less than the duration of the first slot or the first subframe. The first timing advance may indicate the difference between the first sending start time and the first receiving start time. The network device may determine, based on the first timing advance, the difference having the following value range: the difference is greater than or equal to 0 and less than the duration of the first slot or the first subframe. When the first receiving start time is earlier than or equal to the first sending start time, the difference between the first sending start time and the first receiving start time is greater than or equal to 0 and less than duration of the first slot or the first subframe, so that the network device can determine, based on the relationship between the first sending start time and the first receiving start time, to send the indication information to the terminal device.

There may be a plurality of implementations for the first slot and the first subframe. Examples are used below for description. The first slot may include a slot corresponding to a minimum subcarrier spacing used by the network device to send or receive a signal, or a slot corresponding to a subcarrier spacing of 15 KHz. The first slot may be a slot corresponding to a minimum subcarrier spacing supported by a wireless communications system. The minimum subcarrier used by the network device to send or receive a signal varies as the wireless communications system varies. For example, the minimum subcarrier may be 15 KHz. Unlimitedly, as the wireless communications system evolves, the minimum subcarrier used by the network device to send or receive a signal may also have a smaller frequency value. This is not limited herein. In an NR system provided in this embodiment of this application, a value of the duration of the first subframe is 1 ms. It may be understood that the value of the first subframe may further be updated based on evolution of the wireless communications system.

In some Various embodiments, the first sending start time is earlier than or equal to the first receiving start time, the difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

In some Various embodiments, the difference between the first sending start time and the first receiving start time is less than or equal to a preset threshold, and the difference is greater than a value obtained after the threshold is negated; or the difference is less than a threshold, and the difference is greater than or equal to a value obtained after the threshold is negated.

In some Various embodiments, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number.

Further, the uplink subframe and the downlink subframe belong to one or two frames having a same number; or the uplink slot and the downlink slot belong to one or two frames having a same number.

It should be noted that for a description of a relationship satisfied by the first receiving start time and first sending start time and a description of a relationship between the first time period and the second time period in the foregoing embodiment of this application, refer to the example descriptions in the foregoing embodiment. Details are not described herein again.

In some Various embodiments, step 303 of determining, by the terminal device, the second sending start time based on the second receiving start time and the indication information includes the following:

G1. The terminal device determines a total timing advance from the indication information.

G2. The terminal device determines the second sending start time based on the second receiving start time and the total timing advance.

After the network device determines the total timing advance, the network device may send, to the terminal device, the indication information carrying the total timing advance, so that the terminal device can obtain the total timing advance by parsing the indication information. It can be learned from the example descriptions in the foregoing embodiment that the total timing advance includes a sum of the timing advance and the time deviation. The terminal device may obtain the second sending start time by using the total timing advance and the second receiving start time. A manner in which the terminal device parses each field in the indication information is not limited.

In some Various embodiments, in addition to the foregoing method steps, the information receiving method provided in this embodiment of this application may include the following steps:

H1. The terminal device receives second indication information sent by the network device.

H2. The terminal device obtains a timing advance from the second indication information.

The network device may perform a measurement process when the terminal device accesses the cell, so as to obtain the timing advance. The network device sends, to the terminal device, the second indication information carrying the timing advance, so that the terminal device receives the second indication information from the network device. The terminal device may parse out the timing advance by using the second indication information. The terminal device may obtain the second sending start time by using the time deviation and the timing advance.

In some Various embodiments, step 303 of determining, by the terminal device, the second sending start time based on the second receiving start time and first indication information includes:

I1. The terminal device determines the time deviation from the first indication information.

I2. The terminal device determines the second sending start time based on the second receiving start time, the time deviation, and the timing advance.

If the terminal device and the network device are extremely close to each other, for example, when the terminal device is in a cell center area, a distance between the terminal device and the network device is close to 0, and there is no timing advance between the terminal device and the network device; or when the terminal device is in a cell edge area, the terminal device and the network device are relatively far from each other, there is a timing advance between the terminal device and the network device. In this implementation scenario, the terminal device may determine the second sending start time based on the second receiving start time, the time deviation, and the timing advance. After determining the second sending start time, the terminal device may perform uplink transmission, thereby avoiding a transmission failure caused because a correct uplink transmission time cannot be determined.

It can be learned from the example descriptions of this embodiment of this application in the foregoing content that the terminal device first determines the second receiving start time, and then the terminal device receives, based on the second receiving start time, the indication information sent by the network device. The terminal device may determine the second sending start time based on the indication information of the network device and the second receiving start time. After determining the second sending start time, the terminal device may perform uplink transmission, thereby avoiding a transmission failure caused because a correct uplink transmission time cannot be determined.

To help better understand and implement the foregoing solutions of the Various embodiments, corresponding application scenarios are specifically described using examples below.

Referring to FIG. 1, the Various embodiments are mainly applied to a wireless communications system, and in particular, to a communications system in which timing of a downlink frequency band and that of an uplink frequency band are asynchronized. The network device sends a downlink signal to the terminal device on a first frequency band, and the network device receives, on a second frequency band, an uplink signal sent by the terminal device. Sending timing of the network device on the first frequency band and receiving timing of the network device on the second frequency band are asynchronized. It should be noted that receiving timing of the network device on the second frequency band may be different from sending timing of the terminal device on the second frequency band. In consideration of a latency in communication between the terminal device and the network device, timing on a side of the network device is different from that on a side of a terminal. Therefore, the sending timing of the terminal device is always earlier than the receiving timing of the network device.

In various embodiments, detailed descriptions are provided by using an example in which the first time period is specifically a first uplink subframe, the second time period is specifically a first downlink subframe, the third time period is specifically a second downlink subframe, and the fourth time period is specifically a second uplink subframe. In the Various embodiments, a timing relationship between a downlink subframe and an uplink subframe having a same subframe number may be determined, so that the terminal device can determine, based on a number of a downlink subframe, an uplink subframe having a same number same as the downlink subframe, thereby meeting requirements of uplink scheduling and feedback time sequences.

In a communication method provided in the Various embodiments, first, the network device determines a time deviation between a first downlink subframe and a first uplink subframe having a same number. The time deviation may also be referred to as a "timing deviation". In a subsequent embodiment, the "time deviation" is used as an example for description. An absolute value of the time deviation may be less than duration of a slot or a subframe. That the time deviation is less than a slot is used as an example. A smaller value range of the time deviation indicates a smaller quantity of bits that need to be used to quantize the time deviation. In this way, overheads for sending the indication information by the network device are reduced. After the network device determines the time deviation, the network device may send indication information of the time deviation to the terminal device, so that the terminal device can determine, based on the indication information, sending timing of the uplink subframe having the same number as the downlink subframe.

Detailed descriptions are separately provided below from the side of the network device and the side of the terminal device by using examples. The following step 1-1 and step 1-2 may be performed on the side of the network device. The terminal device may perform the following step 2-1, step 2-2, and step 2-3.

First, descriptions are provided from the side of the network device by using an example, and the following steps are mainly included.

Step 1-1: The network device determines a time deviation between timing of the first downlink subframe and timing of the first uplink subframe, where the time deviation is a time deviation of the first uplink subframe relative to the first downlink subframe or a time deviation of the first downlink subframe relative to the first uplink subframe, the first downlink subframe and the first uplink subframe having a subframe number, and also belong to frames having a same number.

It should be noted herein that from a perspective of the network device, the timing of the first downlink subframe should be understood as timing for sending a signal in the first downlink subframe by the network device, and the timing of the first uplink subframe should be understood as timing for receiving a signal in the first uplink subframe by the network device.

In a possible implementation, the time deviation of the first uplink subframe relative to the first downlink subframe is greater than or equal to 0 and less than duration of a slot or a subframe. That the time deviation is less than duration of a slot is used as an example. As shown in FIG. 4-a and FIG. 4-b, an uplink subframe n is earlier than a downlink subframe n, and the uplink subframe n and the downlink subframe n have a same subframe number n, and both belong to a same frame. One subframe may include one or more slots. In the prior art, one subframe includes only two slots. In an NR system provided in various embodiments, one subframe may include one slot and more than two slots, and a quantity of slots included in one downlink subframe may be different from a quantity of slots included in one uplink subframe. For example, a quantity of slots included in an uplink subframe is fixed, but a quantity of subframes included in a downlink subframe may be the same as or different from the quantity of slots included in the uplink subframe. In FIG. 4-a, that the uplink subframe n or the downlink subframe n each includes two slots (a slot 0 and a slot 1) is used as an example. In FIG. 4-b, that the uplink subframe n or the downlink subframe n each includes one slot (a slot 0) is used as an example. The uplink subframe and the downlink subframe are asynchronized, and therefore there is a time deviation.

In some embodiments, when one downlink subframe and one uplink subframe each includes only one slot, obviously, the time deviation may be greater than or equal to 0 and less than duration of a subframe. A length of a subframe may be 1 ms, but a length of a slot may have a plurality of values.

In some embodiments, when the quantity of slots included in the downlink subframe is different from the quantity of slots included in the uplink subframe, the time deviation may be greater than or equal to 0 and less than duration of an uplink slot.

In another possible implementation, the time deviation of the first downlink subframe relative to the first uplink subframe is greater than or equal to 0 and less than duration of a slot or a subframe. That the time deviation is less than duration of a slot is used as an example. As shown in FIG. 5-a and FIG. 5-b, a downlink subframe n is earlier than an uplink subframe n, and the uplink subframe n and the downlink subframe n have a same subframe number n, and both belong to a same frame. One subframe may include one or more slots. In the prior art, one subframe includes only two slots. In an NR system provided in this embodiment of this application, one subframe may include one slot and more than two slots, and a quantity of slots included in one downlink subframe may be different from a quantity of slots included in one uplink subframe. For example, a quantity of slots included in the uplink subframe is fixed, but a quantity of subframes included in the downlink subframe may be the same as or different from that of the uplink subframe. In FIG. 5-*a*, that the uplink subframe n or the downlink subframe n each includes two slots (a slot 0 and a slot 1) is used as an example. In FIG. 5-*b*, that the uplink subframe n or the downlink subframe n each includes one slot (a slot 0) is used as an example. The uplink subframe and the downlink subframe are asynchronized, and therefore there is a time deviation.

In some embodiments, when one downlink subframe and one uplink subframe each includes only one slot, the time deviation may be greater than or equal to 0 and less than duration of a subframe.

In some embodiments, when the quantity of slots included in the downlink subframe is different from the quantity of slots included in the uplink subframe, the time deviation may be greater than or equal to 0 and less than duration of an uplink slot.

In another implementation, the time deviation of the first uplink subframe relative to the first downlink subframe is greater than −a and less than or equal to a, where a>0, and a is half of the duration of the slot or the subframe; or the time deviation is greater than equal to −a and less than a. It should be noted that when the time deviation is greater than 0, the timing of the first uplink subframe is earlier that of the first downlink subframe; or when the time deviation is less than 0, it should be understood that the timing of the first uplink subframe is later than that of the first downlink subframe.

Step 1-2: The network device sends first indication information to the terminal device, where the first indication information indicates the time deviation or a first parameter related to the time deviation.

In an implementation, the first indication information indicates a value of the time deviation.

In another implementation, the first indication information indicates a sum of the time deviation (denoted as a TA 1) and a second timing advance (denoted as a TA 2). In other words, the sum of the TA 1 and the TA 2 is the first parameter.

In a possible manner of various embodiments, the terminal device can learn of only the first parameter, and the first parameter is the sum of the time deviation and the timing advance (denoted as the TA 2). In another possible manner, the terminal device can learn of the time deviation. In this case, whether the terminal device can learn of the timing advance is not limited. It should be noted that the first parameter is a value obtained by calculating the time deviation and the timing advance, and in the example herein, the first parameter is the sum of the time deviation and the second timing advance.

Specifically, the network device may send indication information of the timing advance to the terminal device, and a value of the timing advance is related to a distance between the terminal device and the network device. For the timing advance, in an LTE system, a base station sends a timing advance (namely, $N_{TA}$) to the terminal device by using higher layer signaling. A value range of the parameter is [0, 4096] or [0, 20512]. The terminal device may determine, based on $N_{TA}$, that the second timing advance is $N_{TA} \times Ts$, where Ts indicates a signal sampling time interval in the system. For example, when the terminal device is in a cell center area, that is, a distance between the terminal device and the base station is close to 0, a value of $N_{TA}$ sent by the base station to the terminal device may be 0, and therefore a value of the timing advance is 0. Alternatively, when the terminal device is at a cell edge, that is, a distance between the terminal device and the base station is close to a cell radius, a value of $N_{TA}$ sent by the base station to the terminal device is 4096, and therefore a value of the second timing advance is 4096×Ts. When this implementation is used, the first indication information may indicate TA 1+TA 2.

Detailed descriptions are provided below from the side of the terminal device, and the following steps are mainly included.

Step 2-1: The terminal device determines timing of a second downlink subframe.

In a possible implementation, the terminal device receives a synchronization signal sent by the network device, and the terminal device determines timing of a first downlink subframe based on the synchronization signal.

It should be noted herein that from a perspective of the terminal device, the timing of the second downlink subframe should be understood as timing for receiving a signal in the second downlink subframe by the terminal device, and timing of a second uplink subframe should be understood as timing for sending a signal in the second uplink subframe by the terminal device.

Step 2-2: The terminal device receives first indication information from the network device, where the first indication information indicates a time deviation or a first parameter related to the time deviation, the time deviation is a timing advance of the first uplink subframe relative to the first downlink subframe or a timing advance of the first downlink subframe relative to the first uplink subframe, the first downlink subframe and the first uplink subframe having a same subframe number, and belong to frames having a same number.

The time deviation is the same as that in a specific implementation method in step 1-1. Details are not described herein again.

Step 2-3: The terminal device determines the timing of the second uplink subframe based on the timing of the second downlink subframe and the time deviation indicated by the first indication information.

According to the method in the foregoing Various embodiments, in a scenario in which timing on the downlink frequency band is asynchronized with timing on the uplink frequency band, the network device can determine the time deviation between the downlink subframe and the uplink subframe having a same number, and the network device notifies the terminal device of the time deviation, so that the terminal device can correctly determine timing of the uplink subframe, thereby ensuring correct scheduling and feedback time sequences.

Compared with the prior art, the Various embodiments have the following improvement: In the prior art, for a downlink subframe and an uplink subframe having a same number, timing of the downlink subframe is synchronized with timing of the uplink subframe. In a scenario of uplink sharing between NR and LTE, for a downlink subframe and an uplink subframe having a same number, timing of the downlink subframe may be asynchronized with timing of the uplink subframe. Therefore, various embodiments provide a method for determining a timing relationship between the downlink subframe and the uplink subframe.

In the Various embodiments, an absolute value of the time deviation between the downlink subframe and the uplink subframe having a same number is less than the duration of the slot or the subframe, so that a quantity of bits required by the first indication information can be reduced, thereby reducing signaling overheads. In the Various embodiments, the network device sends, to the terminal device, the first indication information indicating the time deviation, so that the terminal device can determine the timing of the uplink subframe based on the first indication information.

It should be noted that for brief description, the foregoing method embodiments are represented as a series of actions. However, a person skilled in the art should appreciate that this application is not limited to the described order of the actions, because according to this application, some steps may be performed in other orders or simultaneously. It should be further appreciated by a person skilled in the art that the embodiments described in this specification all belong to example embodiments, and the actions and modules are not necessarily required by this application.

To better implement the solutions of the Various embodiments, related apparatuses for implementing the solutions are further provided below.

Referring to FIG. 6-a, a network device 600 provided in an embodiment of this application may include a determining module 601 and a sending module 602.

The determining module 601 is configured to determine a first receiving start time and a first sending start time, where the first receiving start time is a receiving time at which the network device starts to receive a signal in a first time period, and the first sending start time is a sending time at which the network device starts to send a signal in a second time period.

The sending module 602 is configured to send indication information to a terminal device, where the indication information is used to instruct the terminal device to determine a second sending start time, and the second sending start time is determined based on the first receiving start time and the first sending start time.

In some Various embodiments, the first receiving start time is earlier than or equal to the first sending start time, a difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 millisecond ms.

In some Various embodiments, the first sending start time is earlier than or equal to the first receiving start time, a difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

In some Various embodiments, a difference between the first sending start time and the first receiving start time is less than or equal to a preset threshold, and the difference is greater than a value obtained after the threshold is negated; or the difference is less than a threshold, and the difference is greater than or equal to a value obtained after the threshold is negated.

In some Various embodiments, content indicated by the indication information is determined by using a time deviation, and a value of the time deviation is equal to a difference between the first receiving start time and the first sending start time.

In some Various embodiments, the sending module 602 is specifically configured to send, to the terminal device, the indication information carrying the time deviation.

In some Various embodiments, referring to FIG. 6-b, the sending module 602 includes:

a first determining submodule 6021, configured to determine a timing advance obtained when the terminal device accesses a cell of the network device; and a first sending submodule 6022, configured to send, to the terminal device, the indication information carrying a total timing advance, where the total timing advance includes a sum of the timing advance and the time deviation.

In some Various embodiments, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number.

In some Various embodiments, the uplink subframe and the downlink subframe belong to one or two frames having a same number; or the uplink slot and the downlink slot belong to one or two frames having a same number.

It can be learned from the example descriptions of this embodiment of this application in the foregoing content that the network device determines the first receiving start time and the first sending start time. The first receiving start time is the receiving time at which the network device starts to receive a signal in the first time period, and the first sending start time is the sending time at which the network device starts to send a signal in the second time period. The network device sends the indication information to the terminal device. The indication information is used to instruct the terminal device to determine the second sending start time, and the second sending start time is determined based on the first receiving start time and the first sending start time. Because the network device may determine, by using the first receiving start time and the first sending start time, times respectively used for receiving a signal and sending a signal on a side of the network device, and may determine, by using the times respectively used for sending a signal and receiving a signal on the side of the network device, to send the indication information to the terminal device, so that the terminal device can determine the second sending start time based on the indication information of the network device. The second sending start time is determined based on the first receiving start time and the first sending start time. After determining the second sending start time, the terminal device may perform uplink transmission, thereby avoiding a transmission failure caused because a correct uplink transmission time cannot be determined.

Referring to FIG. 7-a, a terminal device 700 provided in an embodiment of this application may include a first determining module 701, a receiving module 702, and a second determining module 703.

The first determining module 701 is configured to determine a second receiving start time, where the second receiving start time is a receiving time at which the terminal device starts to receive a signal from a network device in a third time period.

The receiving module 702 is configured to receive indication information from the network device based on the second receiving start time.

The second determining module 703 is configured to determine a second sending start time based on the second receiving start time and the indication information, where the second sending start time is a sending time at which the terminal device starts to send a signal in a fourth time period.

In some Various embodiments, referring to FIG. 7-b, the second determining module 703 includes:

a first determining submodule 7031, configured to determine a time deviation from the indication information, where a value of the time deviation is equal to a difference between a first receiving start time and a first sending start time, the first receiving start time is a receiving time at which the network device starts to receive a signal in a first time period, and the first sending start time is a sending time at which the network device starts to send a signal in a second time period; and a second determining submodule 7032, configured to determine the second sending start time based on the second receiving start time and the time deviation.

In some Various embodiments, the first receiving start time is earlier than or equal to the first sending start time, the difference between the first sending start time and the first receiving start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 millisecond ms.

In some Various embodiments, the first sending start time is earlier than or equal to the first receiving start time, the difference between the first receiving start time and the first sending start time is greater than or equal to 0 and less than duration of a first slot or a first subframe, the first slot includes a slot corresponding to a minimum subcarrier spacing used by the network device to send or receive a signal, or a slot corresponding to a subcarrier spacing of 15 KHz, and the duration of the first subframe is 1 ms.

In some Various embodiments, the difference between the first sending start time and the first receiving start time is less than or equal to a preset threshold, and the difference is greater than a value obtained after the threshold is negated; or the difference is less than a threshold, and the difference is greater than or equal to a value obtained after the threshold is negated.

In some Various embodiments, referring to FIG. 7-c, the second determining module 703 includes:

a third determining submodule 7033, configured to determine a total timing advance from the indication information; and a fourth determining submodule 7034, configured to determine the second sending start time based on the second receiving start time and the total timing advance.

In some Various embodiments, the first time period includes an uplink subframe, the second time period includes a downlink subframe, and the uplink subframe and the downlink subframe have a same subframe number; or the first time period includes an uplink slot, the second time period includes a downlink slot, and the uplink slot and the downlink slot have a same slot number.

In some Various embodiments, the uplink subframe and the downlink subframe belong to one or two frames having a same number; or the uplink slot and the downlink slot belong to one or two frames having a same number.

It can be learned from the example descriptions of this embodiment of this application in the foregoing content that the terminal device first determines the second receiving start time, and then the terminal device receives, based on the second receiving start time, the indication information sent by the network device. The terminal device may determine the second sending start time based on the indication information of the network device and the second receiving start time. After determining the second sending start time, the terminal device may perform uplink transmission, thereby avoiding a transmission failure caused because a correct uplink transmission time cannot be determined.

It should be noted that content such as information exchange between the modules/units of the apparatus and the execution processes thereof is based on the same idea as the method Various embodiments, and produces the same technical effects as the method Various embodiments. For specific content, refer to the descriptions in the method Various embodiments. Details are not described herein again.

An embodiment of this application further provides a computer storage medium. The computer storage medium stores a program. In the program, some or all steps recorded in the foregoing method embodiment are performed.

Another network device provided in an embodiment of this application is described below. The network device includes a processor, a memory, a communications interface, and a bus. The processor, the communications interface, and the memory communicate with one another by using the bus. The communications interface is configured to receive and send data. The memory is configured to store an instruction. The processor is configured to execute the instruction in the memory, to perform the foregoing information sending method.

The network device is described below in detail. Referring to FIG. 8, a network device 800 includes a receiver 801, a transmitter 802, a processor 803, and a memory 804 (there may be one or more processors 803 in the network device 800, and one processor is used as an example in FIG. 8). The communications interface may include the receiver 801 and the transmitter 802. In some Various embodiments, the receiver 801, the transmitter 802, the processor 803, and the memory 804 may be connected by using the bus or in another manner. In FIG. 8, a connection by using the bus is used as an example.

The memory 804 may include a read-only memory and a random access memory, and provide an instruction and data to the processor 803. A part of the memory 804 may further include a non-volatile random access memory (English full name: Non-Volatile Random Access Memory, English acronym: NVRAM). The memory 804 stores an operating system and an operation instruction, an executable module or a data structure, or a subnet thereof, or an extended set thereof. The operation instruction may include various operation instructions for implementing various operations. The operating system may include various system programs for implementing various basic services and processing hardware-based tasks.

The processor 803 controls an operation of the network device 800. The processor 803 may further be referred to as a central processing unit (English full name: Central Processing Unit, English acronym: CPU). In a specific application, components of the network device 800 are coupled together by using a bus system. In addition to a data bus, the bus system may include a power bus, a control bus, a status signal bus, and the like. However, for clear description, various types of buses in the figure are marked as the bus system.

The methods disclosed in the foregoing Various embodiments may be applied to the processor 803, or may be implemented by the processor 803. The processor 803 may be an integrated circuit chip and has a signal processing capability.

In an implementation process, the steps in the foregoing methods may be implemented by using a hardware integrated logic circuit in the processor 803, or by using instructions in a form of software. The processor 803 may be a general purpose processor, a digital signal processor (English full name: digital signal processing, English acronym: DSP), an application-specific integrated circuit (English full name: Application Specific Integrated Circuit, English acronym: ASIC), a field-programmable gate array (English full name: Field-Programmable Gate Array, English acronym: FPGA) or another programmable logic device, a discrete gate or transistor logic device, or a discrete hardware component. The processor 803 may implement or perform the methods, the steps, and logical block diagrams that are disclosed in the Various embodiments. The general purpose processor may be a microprocessor, or the processor may be any conventional processor or the like. Steps of the methods disclosed with reference to the Various embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 804, and the processor 803 reads information in the memory 804 and completes the steps in the foregoing methods in combination with hardware of the processor 803.

The receiver 801 may be configured to: receive input digit or character information, and generate signal input related to a related setting and function control of the network device 800. The transmitter 802 may include a display device such as a display screen. The transmitter 802 may be configured to output the digit or character information through an external interface.

In this embodiment of this application, the processor 803 is configured to perform the information sending method performed on a side of the network device.

Another terminal device provided in an embodiment of this application is described below. The terminal device includes a processor, a memory, a communications interface, and a bus. The processor, the communications interface, and the memory communicate with one another by using the bus. The communications interface is configured to receive and send data. The memory is configured to store an instruction. The processor is configured to execute the instruction in the memory, to perform the foregoing information receiving method.

Figure 9:
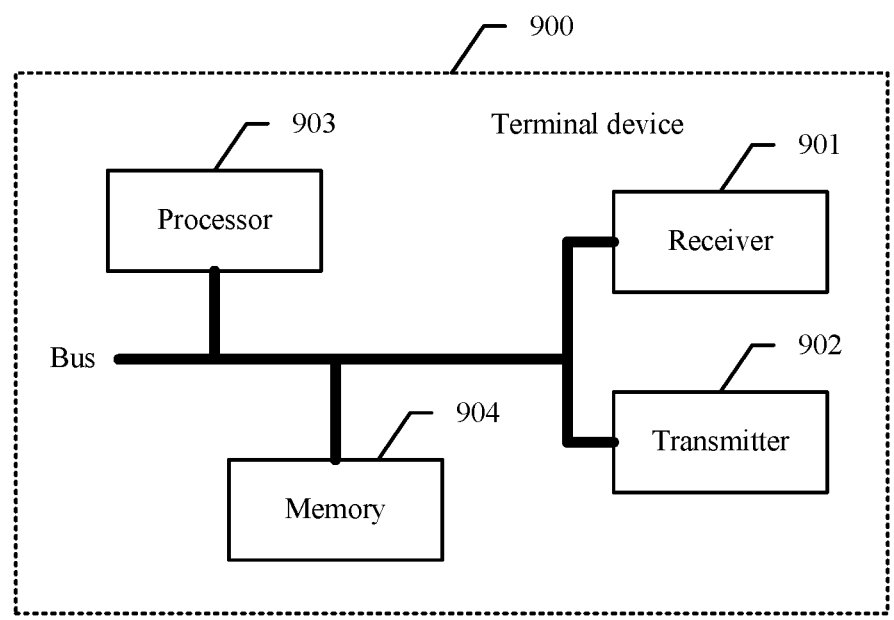
FIG. 9 is a schematic structural composition diagram of another terminal device according to an embodiment of this application.

The terminal device is described below in detail. Referring to FIG. 9, a terminal device 900 includes a receiver 901, a transmitter 902, a processor 903, and a memory 904 (there may be one or more processors 903 in the terminal device 900, and one processor is used as an example in FIG. 9). In some Various embodiments, the receiver 901, the transmitter 902, the processor 903, and the memory 904 may be connected by using the bus or in another manner. In FIG. 9, a connection by using the bus is used as an example.

The memory 904 may include a read-only memory and a random access memory, and provide an instruction and data to the processor 903. A part of the memory 904 may further include an NVRAM. The memory 904 stores an operating system and an operation instruction, an executable module or a data structure, or a subnet thereof, or an extended set thereof. The operation instruction may include various operation instructions for implementing various operations. The operating system may include various system programs for implementing various basic services and processing hardware-based tasks.

The processor 903 controls an operation of the terminal device 900. The processor 903 may further be referred to as a CPU. In a specific application, components of the terminal device 900 are coupled together by using a bus system. In addition to a data bus, the bus system may include a power bus, a control bus, a status signal bus, and the like. However, for clear description, various types of buses in the figure are marked as the bus system.

The methods disclosed in the foregoing Various embodiments may be applied to the processor 903, or may be implemented by the processor 903. The processor 903 may be an integrated circuit chip and has a signal processing capability. In an implementation process, the steps in the foregoing methods may be implemented by using a hardware integrated logic circuit in the processor 903, or by using instructions in a form of software. The processor 903 may be a general purpose processor, a DSP, an ASIC, an FPGA or another programmable logic device, a discrete gate or transistor logic device, or a discrete hardware component. The processor 903 may implement or perform the methods, the steps, and logical block diagrams that are disclosed in the Various embodiments. The general purpose processor may be a microprocessor, or the processor may be any conventional processor or the like. Steps of the methods disclosed with reference to the Various embodiments may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory 904, and the processor 903 reads information in the memory 904 and completes the steps in the foregoing methods in combination with hardware of the processor 903.

In this embodiment of this application, the processor 903 is configured to perform the information receiving method performed by the terminal device.

In addition, it should be noted that the described apparatus embodiment is merely an example. The units described as separate parts may or may not be physically separate, and parts displayed as units may or may not be physical units, may be located in one position, or may be distributed on a plurality of network units. Some or all the modules may be selected based on actual needs to achieve the objectives of the solutions of the embodiments. In addition, in the accompanying drawings of the apparatus embodiments provided in this application, connection relationships between modules indicate that the modules have communication connections with each other, which may be specifically implemented as one or more communications buses or signal cables.

Based on the descriptions of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, or a dedicated circuit. However, as for this application, software program implementation is a better implementation in most cases. Based on such an understanding, the technical solutions of this application essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, or the like) to perform the methods described in the Various embodiments.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the Various embodiments are all or partially generated. The computer may be a general purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

What is claimed is:

1. An information sending method, comprising:
   determining, by a network device, a first receiving start time and a first sending start time, wherein the first receiving start time is a receiving time at which the network device starts to receive a signal in a first time period, and the first sending start time is a sending time at which the network device starts to send a signal in a second time period; and
   sending, by the network device, indication information to a terminal device, wherein the indication information is configured to instruct the terminal device to determine a second sending start time, the second sending start time being determined based on a deviation between the first receiving start time and the first sending start time.

2. The method according to claim 1, wherein
   the first receiving start time is earlier than or equal to the first sending start time or the first sending start time is earlier than or equal to the first receiving start time,
   a difference between the first sending start time and the first receiving start time is greater than 0 and less than a duration of a first slot or a first subframe, and the first slot comprises:
   a slot corresponding to a minimum subcarrier spacing used by the network device to send or receive a signal, or
   a slot corresponding to a subcarrier spacing of 15 KHz, wherein the duration of the first subframe is 1 millisecond (ms).

3. The method according to claim 1, wherein
   a difference between the first sending start time and the first receiving start time is less than or equal to a threshold, and the difference is greater than a value obtained after the threshold is negated; or
   the difference is less than a threshold, and the difference is greater than or equal to a value obtained after the threshold is negated.

4. The method according to claim 1, wherein content indicated by the indication information is determined based on the deviation, and a value of the deviation is equal to a time difference between the first receiving start time and the first sending start time.

5. The method according to claim 1, wherein sending, by the network device, the indication information to the terminal device comprises:
   sending, by the network device to the terminal device, the indication information carrying the deviation, wherein the value of the deviation is equal to a difference between the first receiving start time and the first sending start time.

6. The method according to claim 1, wherein sending, by the network device, the indication information to the terminal device comprises:
   determining, by the network device, a timing advance obtained when the terminal device accesses a cell of the network device; and
   sending, by the network device to the terminal device, the indication information carrying a total timing advance, wherein the total timing advance comprises a sum of the timing advance and the deviation, and the value of the deviation is equal to a difference between the first receiving start time and the first sending start time.

7. The method according to claim 1, wherein
   the first time period comprises an uplink subframe, the second time period comprises a downlink subframe, and the uplink subframe and the downlink subframe have a same subframe number; or
   the first time period comprises an uplink slot, the second time period comprises a downlink slot, and the uplink slot and the downlink slot have a same slot number.

8. The method according to claim 7, wherein
   the uplink subframe and the downlink subframe belong to one or two frames having a same number; or
   the uplink slot and the downlink slot belong to one or two frames having a same number.

9. A network device, comprising:
   a processor; and
   a memory having instructions stored thereon that, when executed by the processor, cause the network device to:
   determine a first receiving start time and a first sending start time, wherein the first receiving start time is a receiving time at which the network device starts to receive a signal in a first time period, and the first sending start time is a sending time at which the network device starts to send a signal in a second time period; and
   send indication information to a terminal device, wherein the indication information is configured to instruct the terminal device to determine a second sending start time, and the second sending start time is determined based on a deviation between the first receiving start time and the first sending start time.

10. The network device according to claim 9, wherein the first receiving start time is earlier than or equal to the first sending start time or the first sending start time is earlier than or equal to the first receiving start time,
a difference between the first sending start time and the first receiving start time is greater than 0 and less than a duration of a first slot or a first subframe, and
the first slot comprises:
  a slot corresponding to a minimum subcarrier spacing used by the network device to send or receive a signal, or
  a slot corresponding to a subcarrier spacing of 15 KHz, wherein the duration of the first subframe is 1 millisecond (ms).

11. The network device according to claim 9, wherein a difference between the first sending start time and the first receiving start time is less than or equal to a preset threshold, and the difference is greater than a value obtained after the threshold is negated; or
  the difference is less than a threshold, and the difference is greater than or equal to a value obtained after the threshold is negated.

12. The network device according to claim 9, wherein content indicated by the indication information is determined based on the deviation, and a value of the deviation is equal to a time difference between the first receiving start time and the first sending start time.

13. The network device according to claim 12, wherein the network device is further caused to:
  send, to the terminal device, the indication information carrying the deviation.

14. The network device according to claim 12, wherein the network device is further caused to:
  determine a timing advance obtained when the terminal device accesses a cell of the network device; and
  send, to the terminal device, the indication information carrying a total timing advance, wherein the total timing advance comprises a sum of the timing advance and the time deviation.

15. The network device according to claim 9, wherein the first time period comprises an uplink subframe, the second time period comprises a downlink subframe, and the uplink subframe and the downlink subframe have a same subframe number; or
the first time period comprises an uplink slot, the second time period comprises a downlink slot, and the uplink slot and the downlink slot have a same slot number.

16. The network device according to claim 15, wherein the uplink subframe and the downlink subframe belong to one or two frames having a same number; or
the uplink slot and the downlink slot belong to one or two frames having a same number.

17. A terminal device, wherein the terminal device comprises:
  a processor; and
  a memory having instructions stored thereon that, when executed by the processor, cause the terminal device to:
  determine a second receiving start time, wherein the second receiving start time is a receiving time at which the terminal device starts to receive a signal from a network device in a third time period;
  receive indication information from the network device based on the second receiving start time;
  determine a deviation between a first receiving start time and a first sending start time based on the indication information, wherein the first receiving start time is a receiving time at which the network device starts to receive a signal in a first time period, and the first sending start time is a sending time at which the network device starts to send a signal in a second time period; and
  determine a second sending start time based on the second receiving start time and the deviation between the first receiving start time and the first sending start time, wherein the second sending start time is a sending time at which the terminal device starts to send a signal in a fourth time period.

18. The terminal device according to claim 17, wherein the terminal device is further caused to:
  determine the deviation from the indication information, wherein a value of the deviation is equal to a time difference between the first receiving start time and the first sending start time.

19. The terminal device according to claim 18, wherein the first receiving start time is earlier than or equal to the first sending start time or the first sending start time is earlier than or equal to the first receiving start time,
the time difference between the first sending start time and the first receiving start time is greater than 0 and less than duration of a first slot or a first subframe, and
the first slot comprises:
  a slot corresponding to a minimum subcarrier spacing used by the network device to send or receive a signal, or
  a slot corresponding to a subcarrier spacing of 15 KHz, wherein the duration of the first subframe is 1 millisecond ms.

20. The terminal device according to claim 18, wherein the time difference between the first sending start time and the first receiving start time is less than or equal to a preset threshold, and the time difference is greater than a value obtained after the threshold is negated; or
the time difference is less than a threshold, and the time difference is greater than or equal to a value obtained after the threshold is negated.

* * * * *